US005330272A

United States Patent [19]

Stoll

[11] Patent Number: 5,330,272

[45] Date of Patent: Jul. 19, 1994

[54] LINEAR DRIVE

[75] Inventor: Kurt Stoll, Esslingen, Fed. Rep. of Germany

[73] Assignee: Festo KG, Esslingen, Fed. Rep. of Germany

[21] Appl. No.: 19,628

[22] Filed: Feb. 18, 1993

[30] Foreign Application Priority Data

Mar. 4, 1992 [DE] Fed. Rep. of Germany ....... 4206751

[51] Int. Cl.[5] ........................ F16C 29/02; F01B 29/00

[52] U.S. Cl. .......................................... 384/26; 92/88; 384/15; 384/49

[58] Field of Search ................. 384/32, 31, 26, 43–45, 384/15, 7; 92/88

[56] References Cited

U.S. PATENT DOCUMENTS

| | | | |
|---|---|---|---|
| 2,473,430 | 6/1949 | Hoffar | 92/88 X |
| 4,664,019 | 5/1987 | Lipinski et al. | 92/88 |
| 4,785,716 | 11/1988 | Vaughn et al. | 92/88 |
| 4,813,341 | 3/1989 | Vaughn | 92/88 |
| 4,852,465 | 8/1989 | Rosengren | 92/88 |

FOREIGN PATENT DOCUMENTS

| | | | |
|---|---|---|---|
| 3124915 | 1/1983 | Fed. Rep. of Germany . | |
| 113790 | 7/1984 | Fed. Rep. of Germany . | |
| 3802703 | 8/1988 | Fed. Rep. of Germany | 92/88 |

OTHER PUBLICATIONS

"Rodless Cylinder is isolated from all but axial loads", 232 Design Engineering, 1986.

*Primary Examiner*—Thomas R. Hannon

*Attorney, Agent, or Firm*—Browdy and Neimark

[57] ABSTRACT

A linear drive which has a housing with a longitudinal slot. A drive part able to be longitudinally moved in the housing is connected by the aid of a link part, running in the longitudinal slot, with a guide part, which is guided for motion on a longitudinal guide arranged outside the housing. As a longitudinal guide a rod guide is provided, which has at least one guide rod adjacent to the housing and spaced from it radially. The guide rod is exposed along its guide stroke and has the guide part encircling it. There is therefore the possibility of accurate guiding of the moving unit without being affected by any tendency of the housing to splay outwards. The costs of manufacture are low.

54 Claims, 2 Drawing Sheets

LINEAR DRIVE

BACKGROUND OF THE INVENTION

The present invention relates to a linear drive comprising a housing which has a longitudinal slot, a drive part able to be moved longitudinally in the housing, a longitudinal guide arranged outside the housing and extending parallel to the direction of movement of the drive part, on which a guide part, suitable for connection with a load, in arranged for movement along a guide path in the longitudinal direction, and a link means connecting the drive part with the guide part with the formation of a common longitudinally moving unit and extending through the longitudinal slot.

Linear drives of this type are termed slotted cylinders and are described in, for instance, the European patent publication 0 113, 790 B1, the European patent publication 0 157 892 B1 or the German patent publication 3,124,915 C2. In such designs the drive part is constituted by a piston, which is moved by the action of a drive fluid. The carriage-like guide part is moved synchronously on displacement of the drive part as a consequence of the coupling via the link means. It serves for connection with a load and to join the drive with moving loads. Owing to the external longitudinal guide for the guide part the drive part is practically not subjected to external factors likely to cause wear.

In the case of the known linear drives the guide part is mounted externally on the housing containing the drive part, straddles the slotted part of the housing and bears on either side of the slot directly on guide tracks shaped or formed directly on the outer periphery of the housing. Although the straddling of the slotted part of the housing prevents splaying of the housing when it is subjected to a high internal pressure, there are substantial transverse forces adjacent to the guiding contact, which may lead to jamming and an impairment in function, and at least to more rapid wear of the guide components. Jamming may, it is true, be substantially prevented if sufficient play is provided adjacent to the guide contact, but apart from the loss of a straddling effect, this means that accuracy of guiding is less satisfactory. In the case of a guide part heavily loaded by an object to be conveyed erratic movements may even effect the drive part, for which reason in the European patent publication 0 113, 790 B1 or the European patent publication 0 157 892 B1 intermediately arranged couplings are provided, which isolate the guide part from the drive part to a certain degree. Apart from these shortcomings the manufacture of the guide tracks on the housing is elaborate and when wear takes place it is difficult to repair the guide tracks.

SHORT SUMMARY OF THE INVENTION

One object of the invention is to provide a linear drive of the type initially mentioned in the case of which the guide part is exactly guided using inexpensive means in a manner independent of the internal pressure present within the housing even in the case of heavy loads to be conveyed.

In order to achieve these and/or other objects appearing from the present specification, claims and drawings, in the present invention the longitudinal guide is designed in the form of a rod guide, which has at least one guide rod arranged at a radial distance from the housing and next thereto so that it is circumferentially accessible along its guide path, which guide rod has the guide part surrounding it.

Instead of elaborate guide tracks to be formed on the housing there is now a rod guide means, which can be produced separately from the housing with the result that the design of the housing is simplified. A guide rod may furthermore be machined using relatively simple means very exactly so that there is a high degree of accuracy of guiding. Owing to the lateral pressing force away from the housing there is a freely running action of the guide even in the case of a high internal pressure. Because the housing does not necessarily have to be encircled by the guide part, it is possible to design for compact transverse dimensions.

Advantageous further developments of the invention are described in claims.

A design is to be preferred in which the rod guide comprises a single guide rod. Additional relative adjustment is unnecessary, as is needed in the case of some situations in which there is a plurality of guide rods. This feature also renders it possible to design linear drives with a particularly small overall size.

More particularly in the case of the use of a single guide rod it is appropriate to have a rod with a non-circular cross section with the result that given a suitable configuration of the guide part for the same there will be automatic prevention of relative twist of the guide part. Swinging movements of the guide part about its longitudinal axis are in consequence out of the question, this meaning that furthermore lateral movements of the drive part connected via the link part are also prevented, something preventing damage or wear to the sealing elements. As a guide rod use is preferably made of one with a polygonal cross section, same being more particularly in the form of a rod with a quadrilateral cross section.

In order to cope with all possible loads there is the proposal in accordance with the invention of fitting the guide part with a guide device encircling the guide rod over its entire periphery with an interlocking action. The guide part can in this case bear against the guide rod to resist lateral force of practically any type and acting in any possible direction in an optimum manner.

In order to attach the guide rod on the housing of the linear drive it is an advantage to make use of two holders, which are set at a fixed distance in relation to each other in the direction of motion of the moving unit and which carry the guide rod, the guide path, along which the guide part sweeps, being arranged between the two holders. On at least one holder it is preferred to provide a stroke limiting abutment projecting into the path of the guide part and which can be constituted directly by one portion of the holder. By means of the holders it is advantageously possible to adjust the length of the guide path in order to take into account different practical requirements.

Further advantageous developments and convenient forms of the invention will be understood from the following detailed descriptive disclosure of embodiments thereof in conjunction with the accompanying drawings.

LIST OF THE SEVERAL VIEWS OF THE FIGURES.

Figures 2, 2A, 2B, 3, 4:
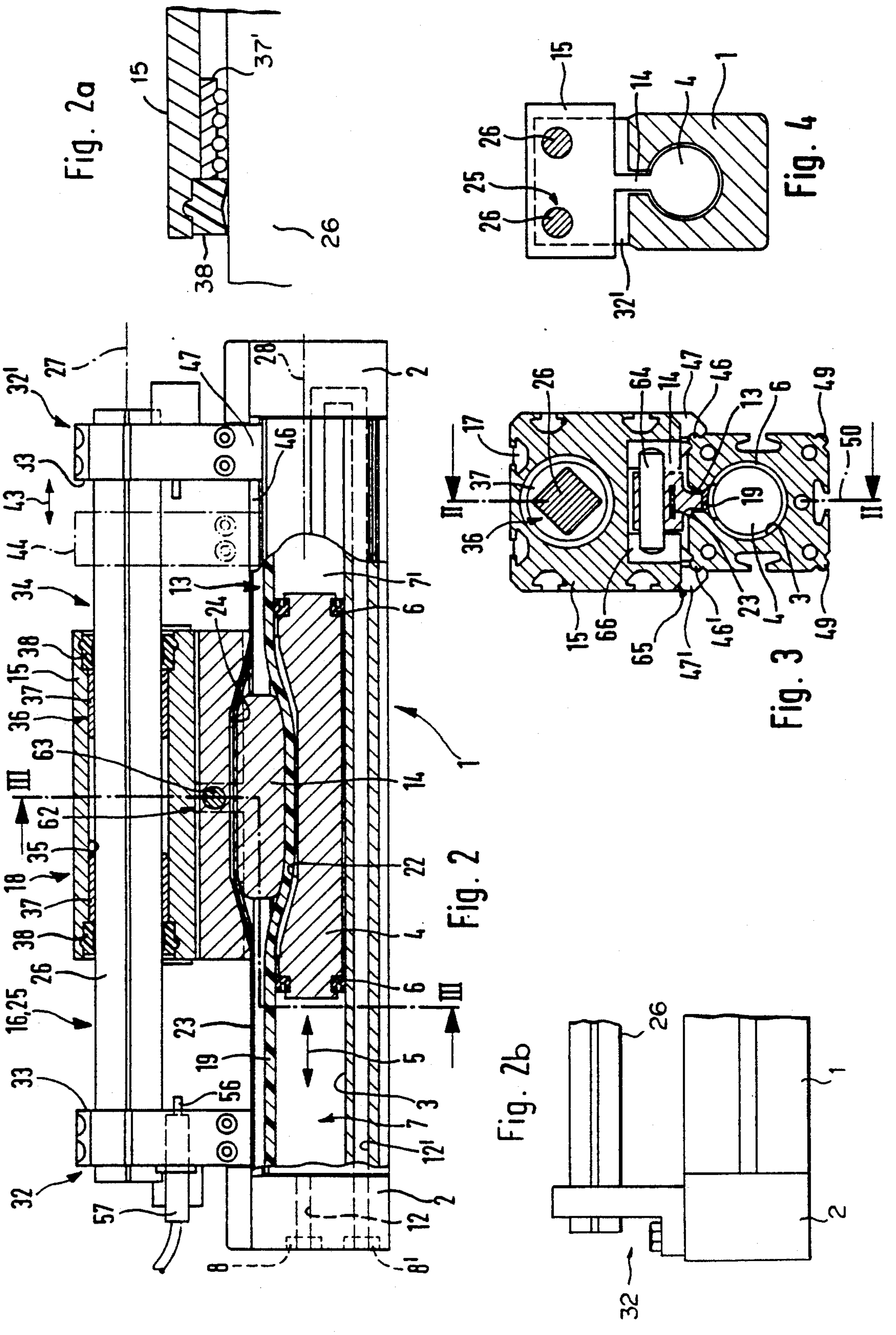
FIG. 2 shows the linear drive of FIG. 1 in a lateral elevation and partly as a sort of longitudinal section as taken on the section line II—II of FIG. 3 partly broken away, the guide rod being fitted in a different position in order to indicate a possible modification in design.

FIG. 2*a* shows a cross section through an antifriction bushing according to the invention.

FIG. 2*b* shows a holder arranged axially outside the longitudinal slotted housing section.

FIG. 3 shows a cross section taken through the linear drive of FIG. 2 on the section line III—III.

FIG. 4 illustrates a further possible design of the linear drive having two guide rods, as seen in a highly diagrammatic cross section.

DETAILED ACCOUNT OF WORKING EMBODIMENTS OF THE INVENTION.

The FIGS. 1 through 3 will in the following be explained in a uniform manner. The details of the differences between the designs due to the different positions of assembly will be gone into later.

The linear drive in accordance with the working embodiments has on the outside a housing with a square external configuration and a linear extent. Adjacent to the two axial end surfaces it possesses detachable housing end covers 2 and in the interior of the housing 1 there is an axially extending housing cavity 3, which is preferably circular in configuration. It receives a drive part 4, which is able to be moved axially reciprocatingly as indicated by the double arrow 5.

The linear drive in accordance with the example is operated by fluid power and more particularly pneumatically. The housing 1 is consequently a cylindrical housing and the drive part 4 is constituted by a piston. There are annular sealing elements 6 borne by the drive part 4, which cooperate in a sealing manner with the wall surface of the housing cavity 3, and are responsible for a fluid-tight division of the housing space 3 into two working spaces 7 and 7′ arranged on opposite sides of the drive part 4. Two fluid power ports 8 and 8′, which are preferably formed on one of the housing covers 2, render possible the supply of fluid power and/or the removal thereof for the working spaces 7 and 7′. Internal fluid power ducts 12 and 12′ constitute a connection between the fluid power ports 8 and 8′ on the one hand and the working spaces 7 and 7′ on the other hand. By the removal and supply of fluid power in a known manner it is hence possible for the drive part 4 to be reciprocated linearly as indicated by the double headed arrow 5.

At one point on the its periphery the housing 1 has a longitudinal slot 13. It extends along the housing space 3. A link part 14 secured to the drive part 4 extends through the longitudinal slot 13 laterally out of the housing 1. Outside the housing 1 it is coupled with a carriage-like guide part 15, which is guided for movement in parallelism with the direction of motion 5 of the drive part 4 on and along a longitudinal guide 16. The longitudinal guide 16, which is arranged outside the housing 1, is fixedly connected with the housing 1 and practically constitutes an integral component of the linear drive.

The guide part 15 serves for connection with a load, i.e. for the output of power. It is fitted with attachment means 17, in the present case in the form of attachment slots, which render possible the detachable connection of articles or loads to be conveyed. Together with the link part 14 and the drive part 4 the guide part 15 constitutes a moving unit 18 able to be moved linearly as indicated by the double arrow 43. By action on the drive part 4 arranged in the housing 1 it is for this reason possible for the guide part 15, which is arranged outside the housing 1, to be moved linearly.

Adjacent to the longitudinal slot 13 the housing is sealed off in a manner indicated for instance in the German patent publication 3,124,915 C2, the European patent publication 0 157 892 B1 or the European patent publication 0 113 790 B1. A detailed description is therefore unnecessary on this point, and reference is to be had to the relevant parts of such patent literature. It is merely to be noted by way of conclusion that the longitudinal slot 13 is sealed off by means of a sealing strip 19 clamped in position adjacent to the housing cover 2. In the part between the two end sealing elements 6 it is clear of the longitudinal slot 13 and extends through an opening 22 in the drive part 4. The part of the sealing strip which is lifted clear, moves together with the drive part 4 when the sealing strip which is lifted clear, moves together with the drive part 4 when the same moves. The working spaces 7 and 7′ are sealed off from the outside at all times, because adjacent thereto the sealing strip 19 sealingly shuts off the longitudinal slot 13.

On the outside of the housing 1 it is possible for the longitudinal slot 13 to be furthermore sealed off by a sealing strip 23, which prevents the ingress of foreign matter. It extends through the link part 14 by way of an opening 24 similar to the opening 22, that is to say it is also lifter clear of the longitudinal slot 13 adjacent to the moving unit 18.

Figure 1:
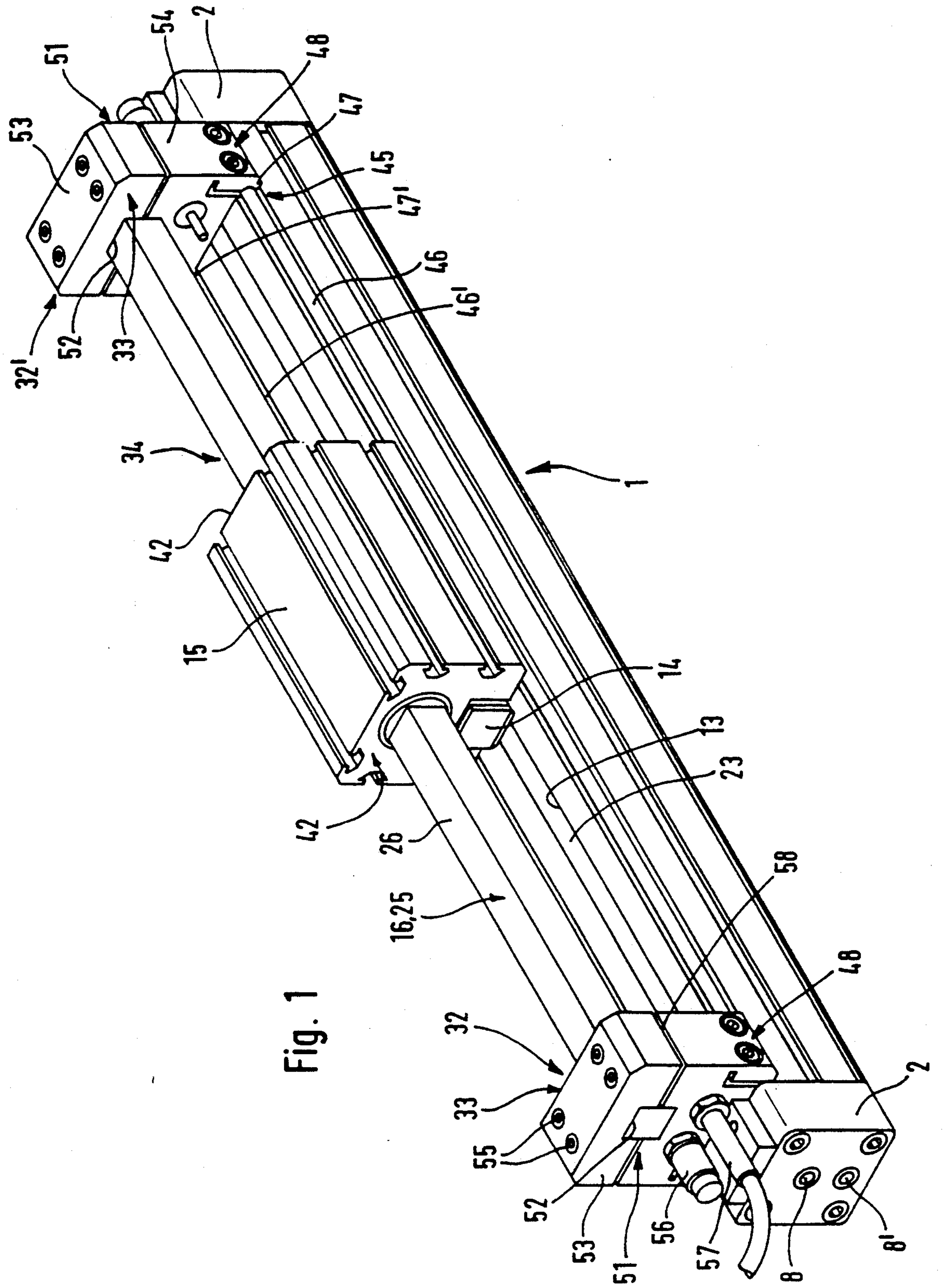
FIG. 1 shows a first design of the linear drive in accordance with the invention in perspective.

The longitudinal guide 14 is constituted by a rod guide 25, which in the working embodiment of FIGS. 1 through 3 comprises a single guide rod 26. This rod extends with a radial clearance to the side of the housing 1 and extends in parallelism to the direction 5 of motion. The longitudinal axis 27 thereof hence extends in parallelism to the longitudinal axis 28 of the housing 1.

The guide rod 26 is detachably mounted on the housing 1 in the present working embodiment by means of two holders 32 and 32′, which are spaced from each other in the longitudinal direction 27. The section, which is between the holders 32 and 32′, of the guide rod 26 constitutes the guide path 34, along which the guide part 15 may sweep as part of its motion. On either holder 32 and 32′ there is a stroke limiting abutment 33 extending into the path of the guide part 15, such abutment 33 being most conveniently constituted by a portion, facing the guide part 15, or surface of the respective holder 32 and 32′. Preset of the stroke of the moving unit 18 is consequently performed advantageously by acting on the guide part 15 so that it is unnecessary to do anything to the drive part 4.

In order to prevent rocking movement about the longitudinal axis 27 of the moving unit 18 the guide rod 26 preferably has a non-circular cross section at least adjacent to the guide path 34 and the guide 15 is locked in relation to the rod in the peripheral direction as regards the longitudinal axis 27 by interlocking contact with the guide rod 26. In order to simplify manufacture the guide rod 26 in the present working embodiment possesses a uniform cross section from one end to the other. It has been found to be best in this respect if the guide rod 26 has a quadrilateral cross section along the guide path 34 with the result that in the working embodiment it is in the form of a four-cornered section or rod. Owing to the simpler production possible and the even distribution of forces resulting it is in this respect best to employ a square rod cross section. In any event it is to be recommended to produce the guide rod 26 of solid material.

The guide rod 26 has the guide part 15 encircling it being an advantage in this respect if, as depicted, there is a full annular extent. The latter is possible since along the guide path 24, the guide rod 26 is exposed over its full periphery and is not supported. In the case of the working embodiment the guide 15 is in the form of a block-like or square body, which has an axially continuous rod socket 35, through which the guide rod 26 is inserted. In this case the guide rod 26 is in full peripheral contact with a guide device 36, secured to the guide part 15 so as to prevent twisting while permitting axial displacement.

The guide device 36 comprises in the present working embodiment two guide bushings 37 in the form of plain bushings, which are secured in place axially, for instance by being press fitted in position in the rod socket 35 and they are a set distance apart in the axial direction. The guide bushings 37 have a sleeve-like configuration, the inner configuration being complementary to the external configuration of the guide rod 26. However instead of the plain bearing support arrangement or as an addition thereto it would be possible to have anti-friction bearing means 37', that is to say so-called linear ball bearings as shown in Figure. The benefit in the form of reduced friction would however as a rule mean higher costs.

In order to protect the guide device 36 against damage and against fouling, it is convenient to arrange it axially between two wipers 38, which are fixed in the guide part 15 encircling guide rod 26 concentrically. In the illustrated working embodiment of the invention annular wipers 38 are inserted in the rod socket 35 and positioned at the axial end part of the guide part 15, each wiper 38 being followed axially to the inside by one of the two guide bushings 37. The wipers 38 consist preferably of synthetic resin material, the inner configuration thereof preferably being premolded in accordance with the outer configuration of the guide rod 26.

The path of movement of the moving unit 18 is preset by the two stroke limiting abutments 33. At the end of the stroke one of the end surfaces of the guide part 15 will run against the stroke limiting abutment 33, which is opposite it in the direction of motion. The abutment is in the present working embodiment constituted, as already mentioned, by the end surface, facing the guide part 15, of a respective holder 32 and 32'. In the working embodiment the stroke of the moving unit 18 may be set to different distance steplessly by presetting guide strokes 34 of different length in a variable manner, for which purpose the two holders 32 are arranged adjustably on the housing 1 for setting them in the longitudinal direction 28. Moreover the axial positions of the holders 32 and 32' may be set different amounts in relation to the guide rod 26.

In order to change, for instance, one of the two end position settings of the moving unit 18, the corresponding holder 32' is released both from the housing 1 and also from the guide rod 26 and then moved in the axial direction as indicated by the double arrow 43 (see FIG. 2) as far as the desired position in relation to the housing 1 and to the guide rod 26. In FIG. 2 the selected setting is marked in broken lines at 44. The setting of the guide rod 26 in relation to the housing 1 is in this respect not changed. A corresponding adjustment is furthermore possible on the other holder 32. It is in this manner that both the relative length of the guide stroke 34 and also the absolute axial position thereof may be set in relation to the housing 1.

The adjustable attachment of the holders 32 and 32' on the housing 1 is ensured in the working embodiment using a further longitudinal guide 45. For this purpose the housing has two axially extending guide rails 46 and 46' which are parallel to each other and are preferably integrally molded. In the case of housing 1, which is for instance square, the guide elements 46 are arranged on either side of the longitudinal slot 13 adjacent to two longitudinal edges of the slot. The holders 32 and 32' are more particularly designed with claw-like guide heads 47 and 47', with which they grip the two guide rails 46 and 46' on opposite sides with the result that in a normal case it is impossible for the holders 32 and 32' to be pulled off the guide rails 46 and 46'. Each guide head 47 and 47' is provided with a clamping device 48 in order to clamp it in a detachable manner on the respectively associated guide rail 46 and 46'. When the clamping devices are released the respective holder 32 and 32' can be shifted axially along the housing 1 and clamped at the desired position 44 by means of the clamping device 48 again.

In the working embodiment the holders 32 and 32' fit around the longitudinal slot 13. This leads to the advantageous effect that a supporting effect is provided for the housing 1 to the extent that it is prevented from being opened splayed out along the longitudinal slot 13. The guiding action of the rod guide is not impaired by this, because the encircling action is exclusively by means of components which are stationary in operation.

In the working embodiment the housing 1 also has a further guide rod 49 adjacent to the two further edges of the housing. In principle it is therefore possible for the holders 32 and 32' to be arranged at either of the peripheral sides of the housing 1. It is then merely necessary to design the link part 14 so that there is a force transmission connection between the drive part 4 and the guide part 15.

The design in accordance with the working embodiment does however offer the advantage of extreme compactness in the direction which is transverse in relation to the longitudinal axis 28 of the housing. The guide rod 26 is radially opposite to the longitudinal slot. It is hence arranged in an axial-radial plane 50 containing the longitudinal axis 28 of the drive part 4 and the longitudinal slot 13.

In the working embodiment it is possible for the holders 32 and 32' to be set at any desired position along the longitudinal slot 13. Owing to the encircling engagement the rod guide 25 is not affected by any loads on the housing 1 with the result that utmost precision is possible. It would also be possible as well to set one respective holder axially outside the longitudinally slotted part of the housing, for example on the end housing covers 2 as shown in FIG. 2*b* . This measurement is particularly useful if axial adjustment of the holders is not necessary.

It will be clear the further longitudinal guide 45 may be fitted with only one guide rail.

The attachment of the guide rod 26 on the respective holder 32 or 32' is preferably ensured as well using clamping devices 51. In the working embodiment each holder 32 and 32' has an axial continuously extending clamping opening 52, into which the guide rod 26 is inserted. Adjacent to each clamping opening 52 the holder 32 and 32' is longitudinally split with the result that we have a removable holder element 53. After removing the holder element 53 the clamping opening 52 is opened peripherally. By bending the holder element 53 to a greater or lesser extent in relation to the respectively remaining holder base 54, it is possible to radially clamp the guide rod 26, which is seated in the clamping opening 52. The holder element 53 therefore belongs to the clamping device 51, the application of the clamping force being more particularly ensured by using a plurality of clamping screws 55 with which the holder element 53 is able to be clamped in relation to the holder base 54.

In the case of a linear motor having a quadrilateral and more particularly square guide rod 26 it is possible for the suitably shaped clamping opening 52 in accordance with FIG. 1 to be so arranged that the plane 58 separating the holder element 53 from the holder base 54 extends in parallelism to two opposite side surfaces of the clamping opening 52. The best possible clamping effect is however only obtained when the separating plane 58 extends between two diagonally opposite corner parts of the clamping opening 52 with the result that there is a clamping effect due to engagement on diverging surfaces. This is the case with the working embodiment in accordance with FIGS. 2 and 3. The invention here provides the advantage of a self-contained, play-free centering action on screwing home the clamping screws 55.

The holders 32 and 32' are furthermore well suited for holding shock absorbers 56 and/or proximity switches 57. When the guide part 15 comes close to one of its two end positions such means can be employed to reduce the end impact and/or to produce a signal for further processing.

Since the guide part 15 in the working embodiment exclusively bears on the guide rod 26 and is not directly supported by the housing 1, no parts are in contact with an unnecessary number of guide means, something which might lead to jamming. The guide part 15 and the movements therefore are therefore not affected by any slight deformation of the housing 1.

The rod guide 25 may be simply attached to the housing 1 and adjusted in position thereon. The moving unit 18 may therefore be constituted by a rigid unit. In the case of working embodiment however only the drive part 4 and the link part 14 are rigidly connected together, whereas the guide part 15 with the link part 14 is only coupled via a hook up device 62 which may transmit axial forces without play, whereas relative radial movements are however just as well possible as rotary movement about the coupling axis extending transversely in relation to the above mentioned axial-radial plane 50. The hook-up connection 62 is produced in the working embodiment since the link part 14 bears a transverse pin 64, which from the facing lower side 65 of the guide part 15 fits into a radial slot 66 formed on the same and open and towards the link part 14. During assembly the guide part 15 only has to be set radially in relation to the longitudinal axis 28 on the link part 14 in order to produce the hook-up connection.

In the case of the working embodiment depicted in FIG. 4 the rod guide 25 possesses two spaced, parallel guides 26. They are both fixed in position like the single guide rod 26 of the other working embodiments of the invention, i.e. on holders 32 and 32'. Owing to the double guiding action so produced it is possible to do without any other means for preventing twist using non-circular outlines of the rods with the result that for example round rods can be employed having a circular cross section. As compared with this design, which is possible in principle, a linear drive with only one guide rod 26 however leads to substantial advantages, apart from the more sparing use of material, that is to say there is no need for relative adjustment between a plurality of guide rods 26.

I claim:

1. A linear drive comprising a housing which has a longitudinal slot, a drive part able to be moved longitudinally in the housing, a longitudinal guide arranged outside the housing and extending parallel to the direction of movement of the drive part, on which a guide part suitable for connection with a load, is arranged for movement along a guide path in the longitudinal direction, and a link means connecting the drive part with the guide part with the formation of a common longitudinally moving unit and extending through the longitudinal slot, wherein the longitudinal guide is designed in the form of a rod guide, which has at least one guide rod arranged at a radial distance from the housing and next thereto so that it is circumferentially accessible along its guide path, the guide part at least partly surrounding the guide rod, wherein the guide rod is secured in position on the housing by means of two holders spaced apart in the direction of movement in relation to each other, between which holders the guide path is arranged, wherein on at least one holder a stroke limiting abutment is provided projecting into the path of the guide part, and, wherein for adjustable preset of guide strokes of different length at least one holder is arranged on the housing so as to be adjustable in the direction of motion and furthermore the guide rod is arranged on at least one of the holders so as to be adjustable in the direction of movement of the moving unit.

2. The linear drive as claimed in claim 1, wherein the rod guide comprises a single guide rod.

3. The linear drive as claimed in claim 1, wherein the rod guide comprises a plurality of parallel guide rods arranged at a distance from each other.

4. The linear drive as claimed in claim 1, wherein at least along the guide path the guide rod has a non-circular cross section.

5. The linear drive as claimed in claim 4, wherein the non-circular cross section is constituted by a quadrilateral cross section.

6. The linear drive as claimed in claim 4, wherein the guide rod is constituted by a polygonal cross section rod.

7. The linear drive as claimed in claim 6, wherein the guide rod is constituted by a quadrilateral cross section rod with a square cross section.

8. The linear drive as claimed in claim 4, wherein the guide part is secured to prevent twist in relation to the guide rod owing to interlocking engagement with the guide rod.

9. The linear drive as claimed in claim 1, wherein the guide part has a guide device encircling the guide rod in an interlocking manner.

10. The linear drive as claimed in claim 9, wherein the guide device comprises at least one plain bushing constituting a guide bushing, completely encircling the guide rod concentrically.

11. The linear drive as claimed in claim 9, wherein the guide device encircles the entire periphery of the guide rod.

12. The linear drive as claimed in claim 9, wherein the guide device comprises at least one anti-friction bushing constituting a guide bushing, completely encircling the guide rod concentrically.

13. The linear drive as claimed in claim 1, wherein at least one such holder is arranged axially outside the longitudinal slotted housing section.

14. The linear drive as claimed in claim 13, wherein said at least one such holder is arranged on a housing end cover.

15. The linear drive as claimed in claim 1, wherein the guide rod is arranged in an axial-radial plane containing the longitudinal axis of the drive part and the longitudinal slot, the guide part being positioned radially opposite to the longitudinal slot.

16. The linear drive as claimed in claim 15, wherein the guide part is detachably mounted on the link part and in this respect is so coupled with the link part that in the axial direction of the axial-radial plane drive forces may be transmitted whereas in the radial direction of this plane however a relative compensatory movement is possible.

17. The linear drive as claimed in claim 1, wherein the rod guide comprises a pair of parallel guide rods arranged at a distance from each other.

18. A linear drive comprising a housing which has a longitudinal slot, a drive part able to be moved longitudinally in the housing, a longitudinal guide arranged outside the housing and extending parallel to the direction of movement of the drive part, on which a guide part suitable for connection with a load, is arranged for movement along a guide path in the longitudinal direction, and a link means connecting the drive part with the guide part with the formation of a common longitudinally moving unit and extending through the longitudinal slot, wherein the longitudinal guide is designed in the form of a rod guide, which has at least one guide rod arranged at a radial distance from the housing and next thereto so that it is circumferentially accessible along its guide path, the guide part at least partly surrounding the guide rod, wherein the guide rod is secured in position on the housing by means of two holders spaced apart in the direction of movement in relation to each other, between which holders the guide path is arranged, and wherein at least one such holder is arranged axially outside the longitudinal slotted housing section.

19. The linear drive as claimed in claim 18, wherein the rod guide comprises a single guide rod.

20. The linear drive as claimed in claim 18, wherein the rod guide comprises a plurality of parallel guide rods arranged at a distance from each other.

21. The linear drive as claimed in claim 18, wherein at least along the guide path the guide rod has a non-circular cross section.

22. The linear drive as claimed in claim 21, wherein the non-circular cross section is constituted by a quadrilateral cross section.

23. The linear drive as claimed in claim 21, wherein the guide rod is constituted by a polygonal cross section rod.

24. The linear drive as claimed in claim 23, wherein the guide rod is constituted by a quadrilateral cross section rod with a square cross section.

25. The linear drive as claimed in claim 21, wherein the guide part is secured to prevent twist in relation to the guide rod owing to interlocking engagement with the guide rod.

26. The linear drive as claimed in claim 18, wherein the guide part has a guide device encircling the guide rod in an interlocking manner.

27. The linear drive as claimed in claim 26, wherein the guide device comprises at least one plain bushing constituting a guide bushing, completely encircling the guide rod concentrically.

28. The linear drive as claimed in claim 26, wherein the guide device encircles the entire periphery of the guide rod.

29. The linear drive as claimed in claim 26, wherein the guide device comprises at least one anti-friction bushing constituting a guide bushing, completely encircling the guide rod concentrically.

30. The linear drive as claimed in claim 18, wherein on at least one holder a stroke limiting abutment is provided projecting into the path of the guide part.

31. The linear drive as claimed in claim 30, wherein for adjustable preset of guide strokes of different length at least one holder is arranged on the housing so as to be adjustable in the direction of motion and furthermore the guide rod is arranged on at least one of the holders so as to be adjustable in the direction of movement of the moving unit.

32. The linear drive as claimed in claim 18, wherein the guide rod is arranged in an axial-radial plane containing the longitudinal axis of the drive part and the longitudinal slot, the guide part being positioned radially opposite to the longitudinal slot.

33. The linear drive as claimed in claim 32, wherein the guide part is detachably mounted on the link part and in this respect is so coupled with the link part that in the axial direction of the axial-radial plane drive forces may be transmitted whereas in the radial direction of this plane however a relative compensatory movement is possible.

34. The linear drive as claimed in claim 18, wherein the rod guide comprises a pair of parallel guide rods arranged at a distance from each other.

35. The linear drive as claimed in claim 18, wherein said at least one such holder is arranged on a housing end cover.

36. A linear drive comprising a housing which has a longitudinal slot, a drive part able to be moved longitudinally in the housing, a longitudinal guide arranged outside the housing and extending parallel to the direction of movement of the drive part, on which a guide part suitable for connection with a load, is arranged for movement along a guide path in the longitudinal direction, and a link means connecting the drive part with the guide part with the formation of a common longitudinally moving unit and extending through the longitudinal slot, wherein the longitudinal guide is designed in the form of a rod guide, which has at least one guide rod arranged at a radial distance from the housing and next thereto so that it is circumferentially accessible along its guide path, the guide part at least partly surrounding the guide rod, and wherein the guide rod is arranged in an axial-radial plane containing the longitudinal axis of the drive part and the longitudinal slot, the guide part being positioned radially opposite to the longitudinal slot.

37. The linear drive as claimed in claim 36, wherein the rod guide comprises a single guide rod.

38. The linear drive as claimed in claim 36, wherein the rod guide comprises a plurality of parallel guide rods arranged at a distance from each other.

39. The linear drive as claimed in claim 36, wherein at least along the guide path the guide rod has a non-circular cross section.

40. The linear drive as claimed in claim 39, wherein the non-circular cross section is constituted by a quadrilateral cross section.

41. The linear drive as claimed in claim 39, wherein the guide rod is constituted by a polygonal cross section rod.

42. The linear drive as claimed in claim 41, wherein the guide rod is constituted by a quadrilateral cross section rod with a square cross section.

43. The linear drive as claimed in claim 39, wherein the guide part is secured to prevent twist in relation to the guide rod owing to interlocking engagement with the guide rod.

44. The linear drive as claimed in claim 36, wherein the guide part has a guide device encircling the guide rod in an interlocking manner.

45. The linear drive as claimed in claim 44, wherein the guide device comprises at least one plain bushing constituting a guide bushing, completely encircling the guide rod concentrically.

46. The linear drive as claimed in claim 44, wherein the guide device encircles the entire periphery of the guide rod.

47. The linear drive as claimed in claim 44, wherein the guide device comprises at least one anti-friction bushing constituting a guide bushing, completely encircling the guide rod concentrically.

48. The linear drive as claimed in claim 36, wherein the guide rod is secured in position on the housing by means of two holders spaced apart in the direction of movement in relation to each other, between which holders the guide path is arranged.

49. The linear drive as claimed in claim 48, wherein on at least one holder a stroke limiting abutment is provided projecting into the path of the guide part.

50. The linear drive as claimed in claim 49, wherein for adjustable preset of guide strokes of different length at least one holder is arranged on the housing so as to be adjustable in the direction of motion and furthermore the guide rod is arranged on at least one of the holders so as to be adjustable in the direction of movement of the moving unit.

51. The linear drive as claimed in claim 48, wherein at least one such holder is arranged axially outside the longitudinal slotted housing section.

52. The linear drive as claimed in claim 51, wherein said at least one such holder is arranged on a housing end cover.

53. The linear drive as claimed in claim 36, wherein the guide part is detachably mounted on the link part and in this respect is so coupled with the link part that in the axial direction of the axial-radial plane drive forces may be transmitted whereas in the radial direction of this plane however a relative compensatory movement is possible.

54. The linear drive as claimed in claim 36, wherein the rod guide comprises a pair of parallel guide rods arranged at a distance from each other.

* * * * *